(12) United States Patent
Abbott et al.

(10) Patent No.: US 11,481,762 B2
(45) Date of Patent: Oct. 25, 2022

(54) METHODS AND APPARATUS FOR CREATING, TRACKING, AND REDEEMING DLT-ENABLED DIGITIZED TOKENS FROM ELECTRICITY GENERATION

(71) Applicant: Dynamis Energy, LLC, Eagle, ID (US)

(72) Inventors: Robert W. Abbott, Boise, ID (US); Kevin W. Malloy, Boise, ID (US)

(73) Assignee: DYNAMIS ENERGY, LLC, Eagle, ID (US)

( * ) Notice: Subject to any disclaimer, the term of this patent is extended or adjusted under 35 U.S.C. 154(b) by 42 days.

(21) Appl. No.: 16/699,902

(22) Filed: Dec. 2, 2019

(65) Prior Publication Data

US 2020/0175504 A1 Jun. 4, 2020

Related U.S. Application Data

(60) Provisional application No. 62/774,450, filed on Dec. 3, 2018.

(51) Int. Cl.
| | | |
|---|---|---|
| G06Q 20/06 | (2012.01) | |
| G06Q 20/22 | (2012.01) | |
| G06Q 20/28 | (2012.01) | |
| G06Q 20/36 | (2012.01) | |
| G06Q 20/38 | (2012.01) | |
| G06Q 40/04 | (2012.01) | |
| G06Q 50/06 | (2012.01) | |
| G07F 15/00 | (2006.01) | |

(52) U.S. Cl.
CPC ....... *G06Q 20/3678* (2013.01); *G06Q 20/389* (2013.01); *G06Q 20/3827* (2013.01); *G06Q 2220/00* (2013.01)

(58) Field of Classification Search
CPC ............. G06Q 20/3678; G06Q 20/389; G06Q 20/3827; G06Q 2220/00; G06Q 20/36; G06Q 40/04; G06Q 20/28; G06Q 20/065; G06Q 20/223; G06Q 50/06; G07F 15/003
See application file for complete search history.

(56) References Cited

U.S. PATENT DOCUMENTS

| | | | | |
|---|---|---|---|---|
| 7,305,310 | B2 * | 12/2007 | Slota ...................... | G01R 35/04 |
| | | | | 702/57 |
| 8,667,060 | B2 * | 3/2014 | Van Olst .................. | H04Q 9/00 |
| | | | | 709/204 |
| 2016/0012424 | A1 * | 1/2016 | Simon .................. | G06Q 20/308 |
| | | | | 705/67 |
| 2017/0317833 | A1 * | 11/2017 | Smith ................... | H04L 9/3066 |
| 2019/0164236 | A1 * | 5/2019 | Mayne ................. | G06Q 20/389 |
| 2019/0370504 | A1 * | 12/2019 | Edwardsson ........... | G06F 21/86 |

* cited by examiner

*Primary Examiner* — Clifford B Madamba
(74) *Attorney, Agent, or Firm* — Parsons Behle & Latimer

(57) ABSTRACT

Peer-to-Peer Electronic token exchange systems and methods utilizing electricity generated and validated with a distributed ledger as the underlying physical value for the token.

18 Claims, 2 Drawing Sheets

METHODS AND APPARATUS FOR CREATING, TRACKING, AND REDEEMING DLT-ENABLED DIGITIZED TOKENS FROM ELECTRICITY GENERATION

CROSS-REFERENCE TO RELATED APPLICATIONS

This application, under 35 U.S.C. § 119, claims the benefit of U.S. Provisional Patent Application Ser. No. 62/774,450 filed on Dec. 3, 2018, and entitled "Method And Apparatus For Creating, Tracking, And Redeeming Blockchain-Enabled Digitized Tokens From Electricity Generation," the contents of which are hereby incorporated by reference herein.

FIELD OF THE DISCLOSURE

This disclosure relates generally to distributed ledger systems and methods. More particularly, this disclosure relates to systems and methods for distributed ledger creation, tracking and redeeming of digitized tokens related to electricity or electrical power generation.

BACKGROUND

A distributed ledger (also referred to herein as a shared ledger or distributed ledger technology or DLT) is a consensus of replicated, shared, and synchronized digital data geographically spread across multiple sites, countries, or institutions. Typically, there is no central administrator or centralized data storage.

A distributed ledger database may be spread across several nodes (e.g., devices) on a peer-to-peer network, where each replicates and saves an identical copy of the ledger and updates itself independently. One advantage is the lack of central authority. When a ledger update happens, each node constructs the new transaction, and then the nodes vote by consensus algorithm on which copy is correct. Once a consensus has been determined, all the other nodes update themselves with the new, correct copy of the ledger. Security is typically accomplished through cryptographic keys and signatures.

A peer-to-peer network is typically required as well as consensus algorithms to ensure replication across nodes is undertaken. One form of distributed ledger design is the blockchain system, which can be either public or private.

Generally, a blockchain is a decentralized, distributed, and oftentimes public, digital ledger that is used to record transactions across many computers so that any involved record cannot be altered retroactively, without the alteration of all subsequent blocks. This allows the participants to verify and audit transactions independently and relatively inexpensively.

A blockchain database is managed autonomously using a peer-to-peer network and a distributed timestamping server. Such a design facilitates robust workflow where participants' uncertainty regarding data security is marginal. The use of a blockchain removes the characteristic of infinite reproducibility from a digital asset. It confirms that each unit of value was transferred only once, solving the long-standing problem of double spending. A blockchain has been described as a value-exchange protocol. A blockchain can maintain title rights because, when properly set up to detail the exchange agreement, it provides a record that compels offer and acceptance. Other forms, functionalities, and types of distributed ledgers, blockchains, and the like, also exist.

SUMMARY

The disclosed systems and methods start where electricity is produced and the amount produced is metered and validated with a Distributed Ledger Technology ("DLT") with the quantity (e.g., kilowatt hour ("kWh")), or other measurable property, unit, or metric of electricity or electrical power generated used as the underlying value of the token. The energy producer or utility can sell or trade tokens tied to the energy production to anyone with a utility account or digital wallet. Energy consumers on the network store credits/tokens in their account/digital wallet and can consume the amount of electricity reflected in their account/digital wallet. The token is redeemed as payment for electricity consumed.

Embodiments of the system's distributed ledger are a data structure that stores a list of transactions and can be thought of as a distributed electronic ledger that records transactions between source (e.g. Token Generation) and destination (e.g. Token Consumption). Each transaction references the hashes of two or more transactions that precede it. As a result, all transactions are immutable and have a history of references that nodes can traverse to validate their trustworthiness. These transactions are time-stamped (providing a history of the exact moment in time of data creation) when the tokens are generated, which may occur at the production of electricity by a generator or pre-sale of electricity to be generated.

The system architecture encompasses light nodes, full nodes, distributed Web Servers, databases and Web Portals in a "nested" structure. As used herein, a "light node" (or "module") is responsible for collecting time-stamped data (e.g., kWh produced or consumed, and geolocation data) from a meter and working with other light nodes to validate the data.

As used herein a "full node" gathers time-stamped data (transactions) from a group (of any number) of modules (light nodes) and verifies and validates the data.

As used herein "distributed web servers" are servers used for permanent storage of validated data (history of transactions) and maintain records of electricity produced and consumed. Distributed web servers also maintain records of all transactions on the network (e.g. tokens used for payment of goods or services other than consumption of electricity).

As used herein a "web portal" is a web (internet) based user interface used to monitor the whole system.

Each module represents a light node on the system. There are multiple modules that interact with each other and confirm the validity of the transactions on the system by validating the time stamps between nodes. The validation of the time stamps between all of the interacting modules ensures the veracity of the data. This creates the system's distributed ledger.

The modules also continue to validate the data read by the meter from the generation source, by constantly checking the calibration of the meter through ongoing updates that occur normally with an Advanced Metering Infrastructure (AMI) meter. The system's nodes maintain the distributed ledger and cryptographically validate each new transaction and thus the data contained within. Because the nodes are interconnected in such a way that they share information, when one node receives a transaction it will be forwarded to every other node in the network. This way all nodes in the network can validate all transactions and store them. At given intervals, a snapshot of this data will be taken and stored for future reference.

Disclosed embodiments include a DLT token exchange system based at least in part upon generated electricity, the system includes an electricity production module that measures an amount of electricity generated during a transaction, wherein the transaction includes identifying data and the electricity production module functions as a node on a DLT network, and wherein the DLT network comprises a plurality of nodes, each node capable of executing a software verification algorithm that includes a cryptographic hash value based at least in part upon transaction identifying data, and wherein successful execution of the software verification algorithm results in a verified transaction and creation of a token. The system also includes an order book stored on the DLT network that stores tokens for verified transactions from the plurality of nodes, and a plurality of digital wallets that communicate with the DLT network and the order book and enable exchanges of tokens among DLT network participants.

Disclosed embodiments further include an electricity consumption module that measures an amount of electricity consumed during a transaction.

Disclosed embodiments further include a token purchase application that enables a DLT network participant to purchase a token for currency and wherein the purchased token is stored in the purchasing DLT network participant's digital wallet. Still further disclosed embodiments enable DLT network participants to exchange tokens for goods or services. Still further disclosed embodiments include an electricity consumption module that measures an amount of electricity consumed during a transaction, and wherein DLT network participants may exchange tokens for the amount of electricity consumed.

In still further disclosed embodiments, the cryptographic hash value is additionally based upon at least one prior verified transaction.

Also disclosed are a method of operating a DLT token exchange system based at least in part upon generated electricity, the method including measuring, with an electricity production module, an amount of electricity generated during a transaction, generating a token for the transaction wherein the token comprises an identifying signature represented as a hash value, distributing the token on a DLT network, the DLT network comprising a plurality of nodes, verifying the token by evaluating the hash value, and, if verified, updating the DLT network and each of the plurality of nodes with an updated hash value that includes a representation of the verified token hash value.

Further disclosed embodiments of the method include enabling a purchaser to purchase a token, the token comprising an identifying signature represented as a hash value, distributing the token on the DLT network, verifying the token by evaluating the hash value, and, if verified, updating the DLT network and each of the plurality of nodes with an updated hash value that includes a representation of the verified token hash value.

In further disclosed embodiments, the method includes enabling the purchaser to redeem a token for payment of an amount of electricity consumed, the token comprising an identifying signature represented as a hash value, distributing the redeemed token on the DLT network, verifying the redeemed token by evaluating the hash value, and, if verified, updating the DLT network and each of the plurality of nodes with an updated hash value that includes a representation of the verified redeemed token hash value, and removing the redeemed from circulation on the DLT network.

In further disclosed embodiments, the cryptographic hash value is additionally based upon at least one prior verified transaction.

Other embodiments, features, and advantages also exist.

Figure 1:
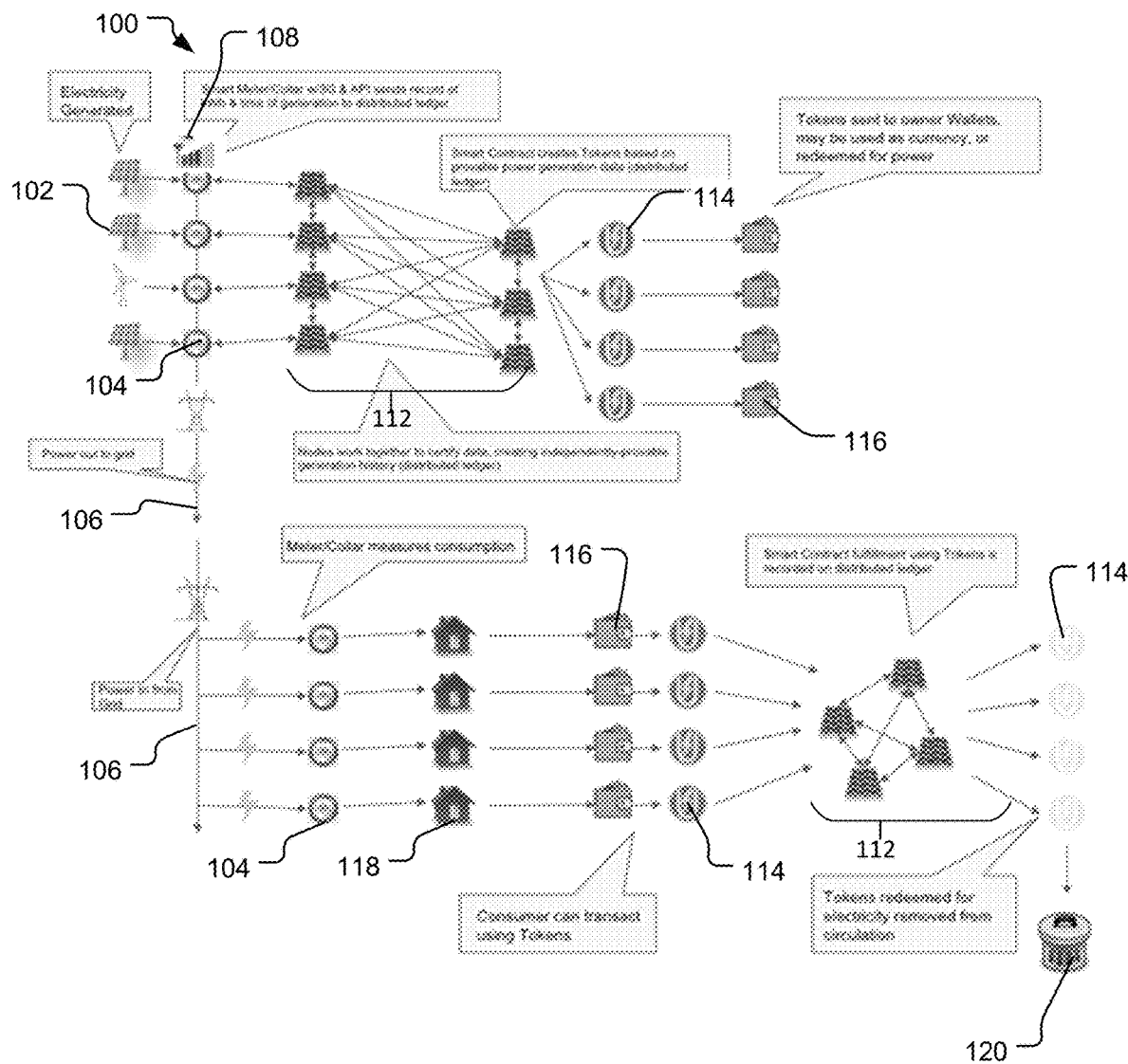
FIG. 1 is a schematic overview of an energy credit DLT ecosystem in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a schematic overview of an energy credit DLT ecosystem 100 in accordance with disclosed embodiments. As illustrated, system 100 may include a number of energy generators 102 which may comprise solar, wind, hydro, waste gasifiers, nuclear, coal fired, or the like electrical generation systems.

Electric energy generated by the electrical generators 102 is measured by a module 104 embodiments of which may be an ANSI certified physical monitoring device connected to any standard AMI meter which monitors and stores the measurements of the amount of the flow of electricity measured on a utility feed or interconnect line 106 by such standard AMI meter. Embodiments of module 104 may also store the time history of the electricity flow through the interconnect line 106 (e.g., power grid). Embodiments of module 104 can use public or other cellular communications 108, or other wireless, mesh technology, WiFi, or the like networks to communicate to the nodes of the system distributed ledger 112 to provide an immutable history of the generation of electricity at the attached module 104 location. Geolocation is used through cellular (or other) communications networks 108 to ensure production is from the specific source it is tied to.

As part of the above noted validation process, embodiments of the module 104 receive calibration information from an associated electricity meter as it is calibrated to ensure production of tokens 114 is not manipulated, rigged, or otherwise fraudulently created. The transaction is shared on the system's distributed ledger network 112. As also shown, smart contracts within and across DLT network 112 are used to create tokens 114 based on provable power generation data and are the transactions that are shared and validated between the nodes. As one of ordinary skill in the art having the benefit of this disclosure would understand, "smart contracts" is an industry term describing a self-executing contract with the terms of the agreement between the buyer and seller being directly written into the lines of software code. The code and the agreements contained therein exist within/across the DLT network 112. The code controls the execution and the transaction is traceable and irreversible.

Embodiments of system 100 include one or more applications (which may be represented by a digital wallet 116) incorporated in the system 100 that allows consumers 118 and prosumers 102 to access the system 100 token 114 exchange. Embodiments of the system 100 application(s) can be available on any computing device (i.e., smartphone, tablet, or PC, laptop, or the like) and can be used for purchase or sale of goods and services using the token 114, or the trade of tokens 114, on the basis of the underlying value of the token 114 used representing a kilowatt of electricity or other metric or measurable property based on an amount of electricity or power. As the cost of a kilowatt of electricity may vary from region to region, the system 100 also acts as an exchange to equalize the amount of tokens 114 necessary to pay for goods and services in such region. As a result, cross-regional and cross-border trade can be fomented on the basis of a standard set around a kilowatt of electricity, a definable, measurable metric.

As also shown in FIG. 1, feed lines 106 (e.g., from the power grid) provide electricity to power consumers 118 which, as noted herein, may be paid for using tokens 114 stored in the consumer 118 digital wallet 116. Token 114 consumption is recorded on the DLT network 112 and distributed to each node on DLT network 112 and consumed tokens 114 are removed from circulation as indicated at 120.

As will be apparent to those of ordinary skill in the art having the benefit of this disclosure, the system exchange stores an order book in the DLT network 112 and a plurality of digital wallets 116 associated with different clients (e.g., 118). The computer system receives new data transaction requests from the individual modules 104 and/or digital wallets 116 at timed intervals and transactions are added to the order book in the DLT 112. This data (timestamp and transaction information) is then verified by the modules 104 on the network 100. If verification is successful, the transactions are added to the distributed ledger 112. The system 100 then monitors the distributed ledger 112 to determine its ongoing validity. The integrity (e.g., confidence that a previously recorded transaction has not been modified) of the entire distributed ledger 112 is maintained because each transaction refers to or includes a cryptographic hash value, generated in the module 104 at the electrical production facility 102, of the prior transaction.

Generally, a hash is a type of algorithm that takes any input, no matter the length, and outputs a standard-length, random output. This string of characters (output) is the hash, and it is deterministic, meaning the data that is hashed will always produce the same output (string of characters). Accordingly, once a transaction refers to a prior transaction, it becomes difficult to modify or tamper with the data (e.g., the transactions) contained therein. This is because even a small modification to the data will affect the hash value of the entire transaction. Each additional transaction increases the difficulty of tampering with the contents of an earlier transaction. Thus, even though the contents of a distributed ledger (e.g., 112) may be available for all to see, they become practically immutable.

As noted, consumers 118 can purchase tokens 114 through a pre-purchase of electricity from a generator 102. These tokens 114 can be used or exchanged with other consumers 118 for goods and services. The tokens 114 can be used multiple times for multiple transactions and are only redeemed when used for purchase of electricity from a generator 102 within the system 100, which then takes that token 114 out of circulation as shown at 120. Generators 102 that produce the tokens 114 may also sell or exchange the tokens 114 with other consumers 118 for goods or services.

In some embodiments, consumers 118 may also include modules 104 (e.g., AMI meters with modules 104) to measure their electric consumption. This data may be stored in their digital wallet 116 and can serve as the basis for payment through tokens 114 stored on the digital wallet 116. The module 104 itself may also be used as a node on DLT network 112 to help in validating transactions on the distributed ledger 112.

Figure 2:
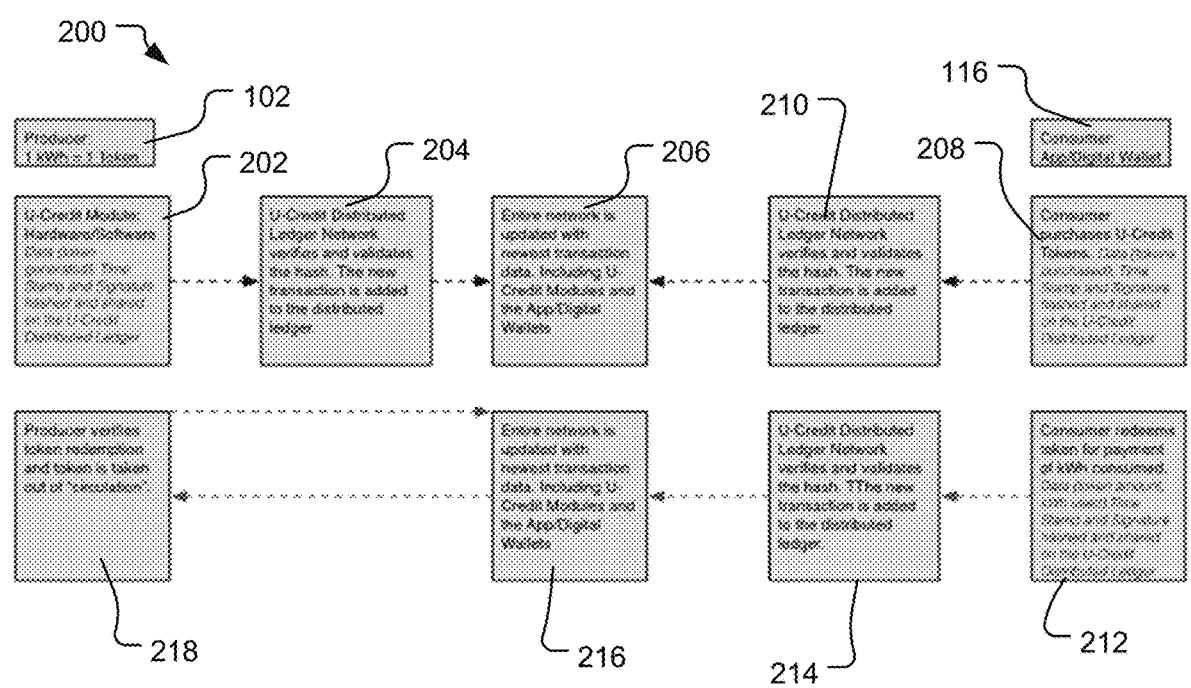
FIG. 2 is a schematic flow chart of workflow for a token in accordance with disclosed embodiments.

FIG. 2 is a schematic flow chart of workflow 200 for a token 114 in accordance with disclosed embodiments. As shown a producer (e.g., 102) uses module 104 to create a token 114, as shown at 202, based on some quantity or other metric or measurable property of electricity or power. For example, as shown in FIG. 2, a token may be based on a kWh or the like. As also indicated at 202 the token 114 may be time-stamped and signature hashed and then shared on the DLT network 112. As indicated at 204 the DLT network 112 verifies and validates the hash and a new transaction is added to the DLT network 112. As shown at 206 the entire network 112, including each module 104 and each digital wallet 116 is updated with the new transaction information.

As also shown in FIG. 2, starting at consumer (e.g., 118) or digital wallet 116, at 208 a consumer may purchase a token 114. As also shown, the token 114 is time-stamped and signature hashed and shared on the DLT network 112. At 210 the DLT network 112 verifies and validates the hash and a new transaction is added to the DLT network 112. As shown, the system 100 again updates the entire network at 206.

As shown in FIG. 2, token 114 consumption may proceed as shown at 212 where a consumer redeems a token 114 for payment of power consumption (e.g., kWh used) and the token amount is time stamped and signature hashed and shared with the entire DLT network 112. Then, at 214, the DLT network 112 verifies and validates the hash and a new transaction is added to the DLT network 112. At 216 the entire DLT network 112 is updated with the new transaction data. At 218 the producer (e.g., 102) verifies a token 114 has been redeemed and the token 114 is taken out of circulation (e.g., at 120). Then, as indicated at 216, the entire DLT network 112 is updated.

Although various embodiments have been shown and described, the present disclosure is not so limited and will be understood to include all such modifications and variations would be apparent to one skilled in the art.

What is claimed is:

1. A computer-implemented distributed ledger technology ("DLT") token exchange system based at least in part upon generated electricity, the system comprising:
   instructions to cause at least one server device and related data processing and storage apparatus to operate over a peer-to-peer network to provide a system comprising:
   an electricity production module that measures an amount of electricity generated during a transaction;
   wherein the transaction includes identifying data and the electricity production module functions as a node on a DLT network; and
   wherein the DLT network comprises a plurality of nodes that execute a software verification algorithm that includes a cryptographic hash value based at least in part upon transaction identifying data; and
   wherein successful execution of the software verification algorithm results in a verified transaction and creation of a token;
   an order book stored on the DLT network that stores tokens for verified transactions from the plurality of nodes; and a plurality of digital wallets that communicate with the DLT network and the order book and enable exchanges of tokens among DLT network participants.

2. The DLT token exchange system of claim 1 further comprising:
an electricity consumption module that measures an amount of electricity consumed during a transaction.

3. The DLT token exchange system of claim 1,
wherein the DLT network further comprises:
a token purchase application that enables a DLT network participant to purchase a token for currency and wherein the purchased token is stored in the purchasing DLT network participant's digital wallet.

4. The DLT token exchange system of claim 3,
wherein DLT network participants exchange tokens for goods or services.

5. The DLT token exchange system of claim 3, further comprising:
an electricity consumption module that measures an amount of electricity consumed during a transaction; and
wherein DLT network participants may exchange tokens for the amount of electricity consumed.

6. The DLT token exchange system of claim 1,
wherein the cryptographic hash value is additionally based upon at least one prior verified transaction.

7. The DLT token exchange system of claim 1,
wherein the electricity production module comprises a physical monitoring device connected to an Advanced Metering Infrastructure (AMI) meter.

8. The DLT token exchange system of claim 7,
wherein the physical monitoring device comprises an American National Standards Institute (ANSI) certified physical monitoring device.

9. The DLT token exchange system of claim 8,
wherein the electricity production module validates the amount of electricity measured by the AMI meter by a constant check of a calibration of the AMI meter through ongoing updates.

10. A computer-implemented method of operating a distributed ledger technology ("DLT") token exchange system based at least in part upon generated electricity, the method comprising:
instructions to cause at least one server device and related data processing and storage apparatus to operate over a peer-to-peer network to provide a method comprising:
measuring an amount of electricity generated during a transaction with an electricity production module;
wherein the transaction includes identifying data and the electricity production module functions as a node on a DLT network; and
wherein the DLT network comprises a plurality of nodes that execute a software verification algorithm that includes a cryptographic hash value based at least in part upon transaction identifying data; and
wherein successful execution of the software verification algorithm results in a verified transaction and creation of a token;
storing tokens for verified transactions from the plurality of nodes in an order book stored on the DLT network; and
enabling exchanges of tokens among DLT network participants via a plurality of digital wallets that communicate with the DLT network and the order book.

11. The method of operating the DLT token exchange system of claim 10,
wherein the electricity production module comprises a physical monitoring device connected to an Advanced Metering Infrastructure (AMI) meter.

12. The method of operating the DLT token exchange system of claim 11,
wherein the physical monitoring device comprises an American National Standards Institute (ANSI) certified physical monitoring device.

13. The method of operating the DLT token exchange system of claim 12, further comprising
validating, with the electricity production module, the amount of electricity measured by the AMI meter by constantly checking a calibration of the AMI meter through ongoing updates.

14. The method of operating the DLT token exchange system of claim 10 further comprising:
measuring an amount of electricity consumed during a transaction with an electricity consumption module.

15. The method of operating the DLT token exchange system of claim 10 wherein the DLT network further comprises:
a token purchase application that enables a DLT network participant to purchase a token for currency and wherein the purchased token is stored in the purchasing DLT network participant's digital wallet.

16. The method of operating the DLT token exchange system of claim 15,
wherein DLT network participants exchange tokens for goods or services.

17. The method of operating the DLT token exchange system of claim 15 further comprising:
measuring an amount of electricity consumed during a transaction with an electricity consumption module; and
wherein DLT network participants may exchange tokens for the amount of electricity consumed.

18. The method of operating the DLT token exchange system of claim 10,
wherein the cryptographic hash value is additionally based upon at least one prior verified transaction.

* * * * *